United States Patent
Van Brocklin et al.

(10) Patent No.: US 7,324,128 B2
(45) Date of Patent: Jan. 29, 2008

(54) SYNCHRONIZATION OF PIXILATED LABELING MEDIA

(75) Inventors: Andrew L. Van Brocklin, Corvallis, OR (US); P. Guy Howard, Junction City, OR (US); Daryl E. Anderson, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 620 days.

(21) Appl. No.: 10/834,744

(22) Filed: Apr. 28, 2004

(65) Prior Publication Data

US 2005/0243689 A1 Nov. 3, 2005

(51) Int. Cl.
*B41J 2/435* (2006.01)
*B41J 2/47* (2006.01)

(52) U.S. Cl. ................ 347/224; 347/225
(58) Field of Classification Search ............ 369/93–98, 369/124.14–127, 280; 347/224–225; 430/320
See application file for complete search history.

(56) References Cited

U.S. PATENT DOCUMENTS

| 5,843,626 | A | * | 12/1998 | Ohta et al. ................ 430/320 |
| 7,079,468 | B2 | * | 7/2006 | Worthington et al. ......... 369/94 |
| 2003/0179679 | A1 | | 9/2003 | Morishima |

OTHER PUBLICATIONS

"LightScribe Direct Disc Labeling," Hewlett-Packard News Advisory Article, (Kinley & Donahue, eds.), (2004).
"What is LightScribe?" Hewlett-Packard website (http://www.lightscribe.com/user/whatisLightScribe.aspx) (2004).

* cited by examiner

*Primary Examiner*—Hai Pham

(57) ABSTRACT

A system and method for synchronization of a pixilated labeling media and a digital medium are disclosed. The digital medium includes a substrate and a pixilated labeling layer disposed on the substrate. The labeling layer includes a plurality of color pixels adapted to form a predetermined color when activated and a plurality of synchronization pixels interspersed among the color pixels. The synchronization pixels are distinguishable by a sensor from the color pixels prior to activation of the color pixels.

38 Claims, 7 Drawing Sheets

SYNCHRONIZATION OF PIXILATED LABELING MEDIA

BACKGROUND OF THE INVENTION

The present invention relates generally to the field of media labeling. In particular, the invention relates to methods and systems for synchronizing a pixilated labeling media.

Digital media, such as compact discs (CDs) or digital video discs (DVDs), are a popular form of storage media. Recently, writable digital media have become increasingly popular among users for storing personalized data, including creating their own set of musical compilations, pictures, etc. Once the user has stored or written digital data onto the medium, the user typically labels the medium by either writing on the medium by hand or affixing a printed label onto the medium using an adhesive.

SUMMARY OF THE INVENTION

One embodiment of the invention relates to a digital medium. The digital medium includes a substrate and a pixilated labeling layer disposed on the substrate. The labeling layer includes a plurality of color pixels adapted to form a predetermined color when activated and a plurality of synchronization pixels interspersed among the color pixels. The synchronization pixels are distinguishable by a sensor from the color pixels prior to activation of the color pixels.

Another embodiment of the invention relates to a method of synchronizing a pixilated labeling media. The method includes detecting one or more synchronization pixels interspersed among a plurality of color pixels on a labeling layer of a digital media, and synchronizing the labeling layer with a desired activation of selected color pixels on the labeling layer.

It is to be understood that both the foregoing general description and the following detailed description are exemplary and exemplary only, and are not restrictive of the invention as claimed.

DETAILED DESCRIPTION OF CERTAIN EMBODIMENTS

One labeling technology, developed by Hewlett Packard and known as LightScribe Direct Disc Labeling provides a layer of laser-sensitive film on the disc. The film is of a neutral color prior to activation. The film is activated by the energy from a laser, such as the laser in a CD drive or a DVD drive. The energy in the laser causes the activated film to change color, thereby producing a grayscale image. For additional details on LightScribe, reference may be made to www.lightscribe.com.

A system for producing a color image includes a pixilated arrangement of a film layer on the disc. The pixilated image includes pixels of three or more colors arranged in systematic manner. The three colors are, in one embodiment, prime colors such as yellow, magenta and cyan, or red, green and blue. Thus, the appearance of any other color can be generated by the appropriate combination of pixels, similar to the operation of a color video monitor. In such an arrangement, a single layer of film can provide a color image with a single laser pass.

Figure 1:
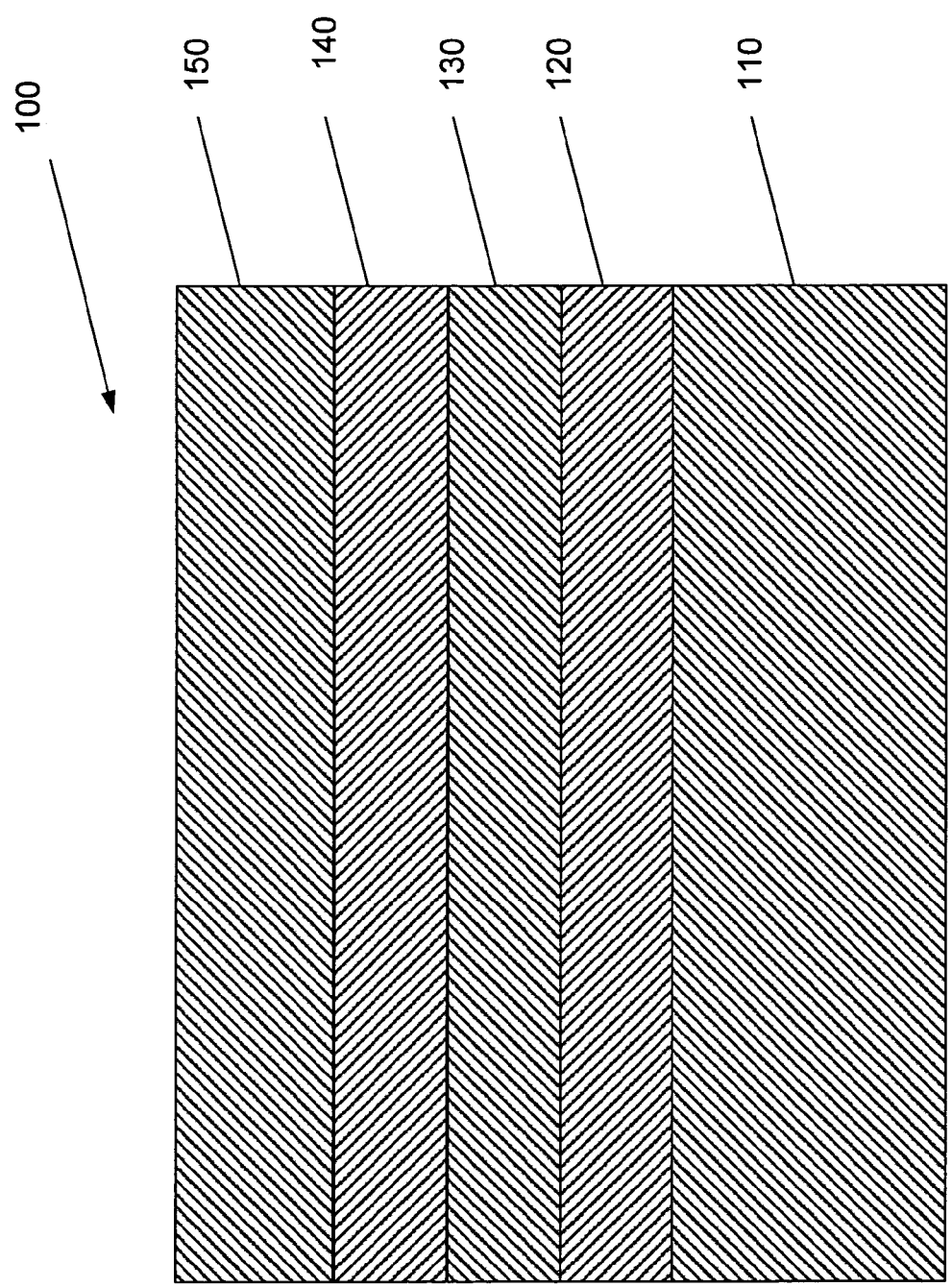
FIG. 1 is a cross-sectional view of a disc medium according to an embodiment of the invention.

Referring to FIG. 1, a cross-sectional view of one embodiment of a disc medium, such as a compact disc or a digital video disc, is illustrated. The medium 100 includes a substrate layer 110, which in one embodiment may be 1.2 mm thick and may be made of a laser-transparent material such as polycarbonate or glass, for example. A data layer 120 is provided on the substrate layer 110 upon which digital data may be written and stored. The data layer 120 may be formed of, for example, a UV light-cured layer of acrylate. In alternate embodiments, the data layer 120 may be one or more grooved tracks formed on the substrate itself. The data can then be read from the data layer 120 using a laser. As is well understood by those skilled in the art, a laser generally penetrates through the substrate layer 110 to read from or write to the data layer 120.

A protective layer 130 is provided to protect the data layer 120. The protective layer 130 may be, for example, an aluminum or gold reflective layer. A thin layer of clear lacquer 140, such as acrylic, is provided for further protection. The lacquer layer 140 may have a thickness of approximately four microns.

The layers 110, 120, 130, 140 are typical for existing disc media. These layers 110, 120, 130, 140 in combination form the basic storage media known commonly as CDs and DVDs, for example. The thickness and materials of these layers 110, 120, 130, 140 is not limiting on the present invention. Commercially manufactured media with specific data, such as a movie, typically includes a silkscreen label on top of the lacquer layer 140. In the case of the LightScribe technology described above, a thin labeling film (approximately 8 microns thick) of monochromatic, laser-sensitive material is positioned on the lacquer layer 140. In an embodiment of the present invention, a thin pixilated layer 150 of laser-sensitive material is provided which may be made from a variety of materials. Note that the material used for the pixilated layer 150 is not limiting on the invention. As described below, the laser-sensitive material of the pixilated layer 150 includes a plurality of dyes arranged in a pixilated manner. The structure of the pixilated layer 150 is described below with reference to FIGS. 2-4.

Figure 2:
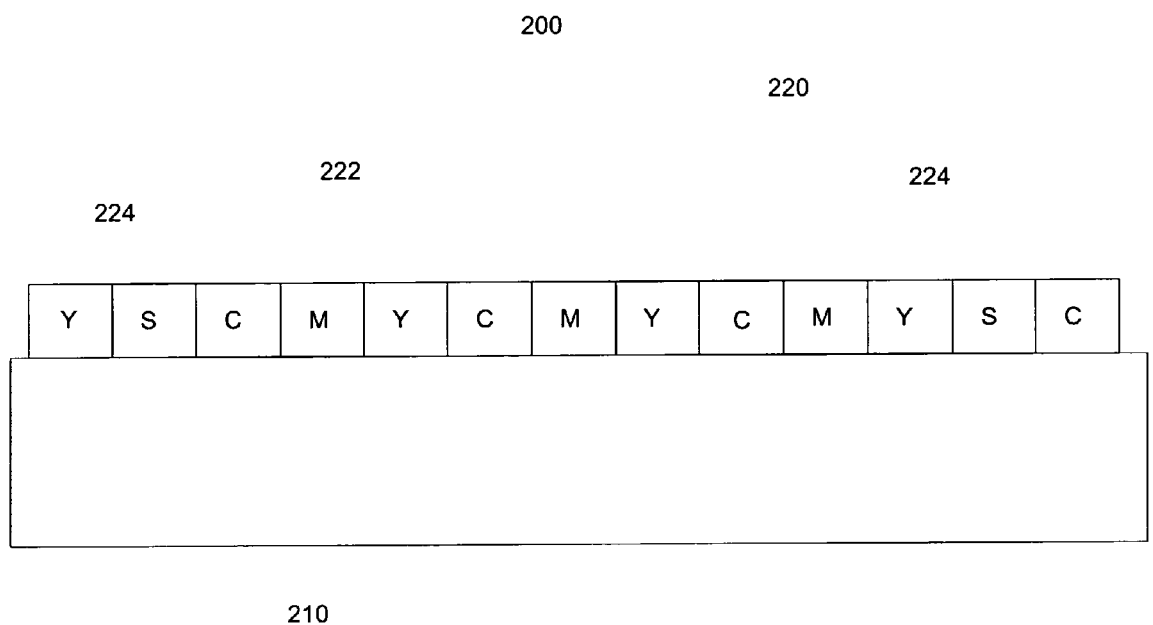
FIG. 2 is a cross-sectional view of a disc medium illustrating a pixel arrangement along one track according to an embodiment of the invention.

FIG. 2 illustrates a disc media according to an embodiment of the invention. The disc 200 includes a disc structure 210 which may include the layers 110, 120, 130, 140 described above with reference to FIG. 1. The disc structure 210 in some embodiments is circular with a circular hole in the middle, as seen in commonly available digital disc media. A pixilated layer 220 is mounted above or deposited upon the disc structure 210. The pixilated layer 220 may cover the entire circular disc structure 210 or, alternatively, may cover only a portion of the disc structure. The pixilated layer 220 includes a plurality of pixels 222, 224 that may be arranged in a variety of manners. For example, the pixels may be positioned in a series of tracks oriented as concentric circles. In another embodiment, the pixels may be arranged along a single spiral path. FIG. 2 illustrates the pixels 222, 224 in one section of the pixilated layer 220.

In the embodiment illustrated in FIG. 2, a plurality of pixels types form the pixilated layer 220. The pixel types may include color pixels 222 and synchronization pixels 224. In the illustrated embodiment, the color pixels 222 include cyan (C), magenta (M) and yellow (Y). Although the illustrated embodiment includes cyan, magenta and yellow pixels to form color, it will be understood by those skilled in the art that numerous other combinations of three or more color pixels may also be used.

The color pixels 222 are formed using a formulation of a visible dye. The dye can be any acid-activated dye or a leuco dye. In one embodiment, the cyan pixels contain a dark cyan dye, the magenta pixels contain a dark magenta dye, and the yellow pixels contain a medium yellow dye. Each dye includes an antenna molecule that absorbs energy at the wavelength of the laser (e.g., 780 nm for one type of drive; other types of drives may have lasers that produce energy at different wavelengths). The absorption of the energy into the pixel causes a visible component in the dye of that pixel to be activated. Thus, exposure to the laser causes the pixel to display the intended color.

The pixels may be formed using a method similar to methods used in offset printing method of media such as paper. In one embodiment, the disc structure 210 is held in a fixture for alignment, which may be either mechanical or visual, for example. The un-activated dye for a specific color may be deposited onto the disc structure 210 at the desired positions. The disc structure 210 may then be re-aligned through rotation, for example, and a dye for another color may then be deposited. The process may be repeated until each pixel is formed with the desired dye.

The synchronization pixels (S) 224 may be interspersed among the color pixels 222. In the illustrated embodiment, a synchronization pixel 224 is provided after every three sets of CMY pixels. In other words, every tenth pixel is a synchronization pixel. In other embodiments, the synchronization pixel may be positioned at every n pixels, where n may be any integer. In one embodiment, a synchronization pixel is provided after n sets of color pixels, where each set includes a sequence of pixels including at least one of each color pixel.

The synchronization pixels 224 are distinguishable from the colored pixels by the laser unit of an optical drive, such as a CD Read/Write (CD R/W) drive or a DVD read/write drive. The laser unit may include an integral sensor (as described below with reference to FIG. 7, for example) which detects, for example, the reflectivity of the pixels. In this regard, the synchronization pixels 224 may be made distinguishable by selecting a material for the synchronization pixels having a sufficiently different reflectivity than each of the color pixels. In one embodiment, the synchronization pixels include a clear lacquer. Alternatively, the synchronization pixels may be open spaces. In one embodiment, the synchronization panels be transparent down to the substrate layer.

Figure 7:
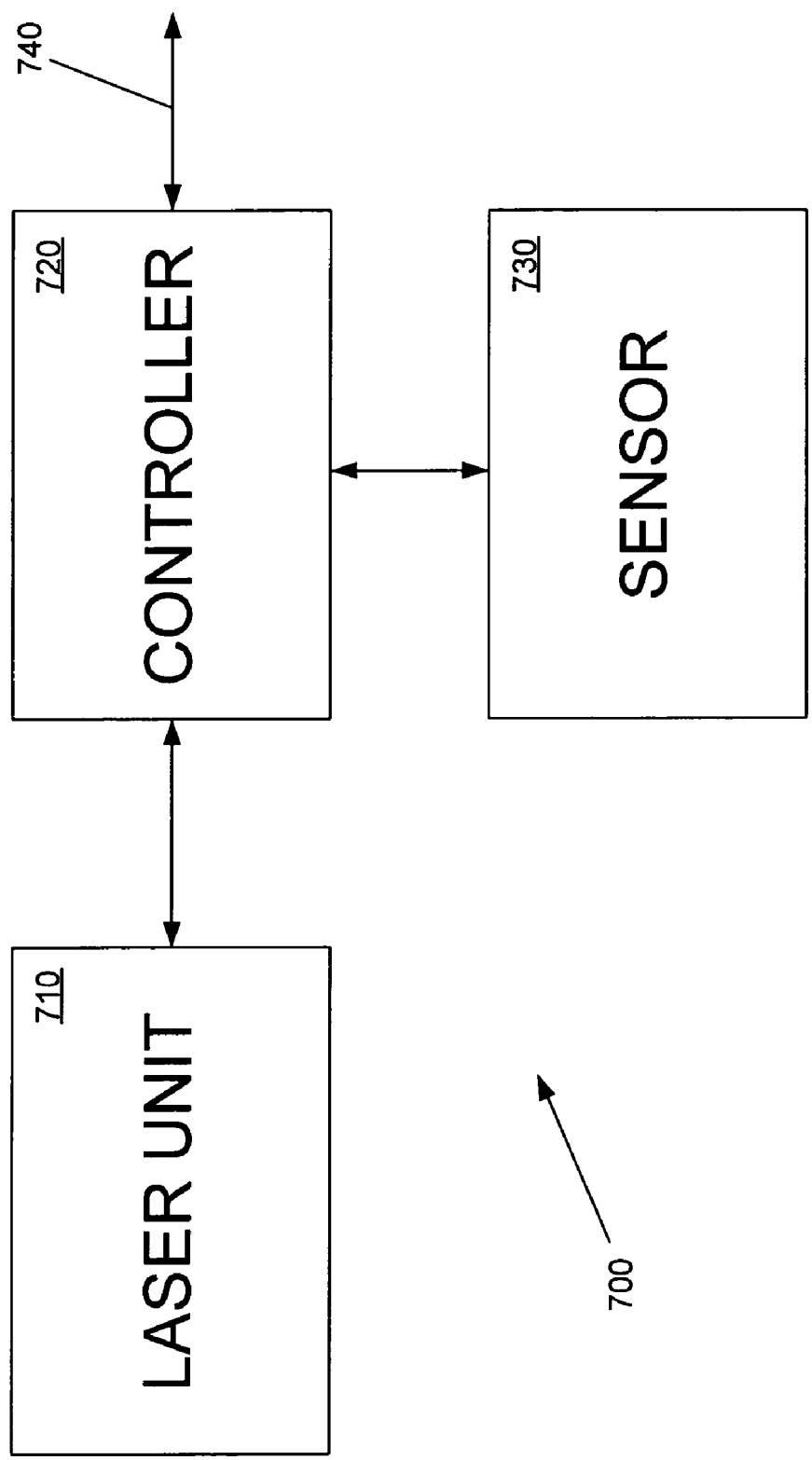
FIG. 7 is a schematic illustration of an embodiment of an optical drive for generating labels on optical media.

Referring now to FIG. 7, an exemplary optical drive capable of generating labels on media, such as the disc 200 described above with reference to FIG. 2, is schematically illustrated. The drive 700 includes a laser unit 710 adapted to emit energy. The energy is emitted at a predetermined wavelength, as noted above, to activate each color pixel desired to be activated. In certain embodiments, the laser unit 710 may be integrated with a primary laser in the drive for reading or writing digital data. The drive 700 also includes a sensor 730 for detecting or measuring the reflectivity of the pixels on the pixilated labeling layer of an optical medium. In this regard, the sensor 730 is able to detect or measure the reflectivity with sufficient precision to distinguish synchronization pixels from the color pixels. In certain embodiments, the sensor 730 may be integrated with the laser unit 710.

A controller 720 is provided in the drive 700 to control operation of the drive. In this regard, the controller 720 may communicate with an external module or software, as indicated by the double arrow 740, to receive instructions relating to, for example, which pixels are to be activated or what image is to be produced. As noted below, the external module or software may be a labeling software adapted to allow a user to specify or design a label. Based on these instructions, the controller 720 uses reflectivity data from the sensor 7320 to synchronize the pixilated labeling layer of the medium with the desired activation of selected pixels, as specified by the external software. The controller 720 can then issue commands to the laser unit 710 to activate the selected pixels.

In operation, a user typically places the disc medium 200 into a CD R/W drive first with the substrate side (data side) down. A laser unit operates from under the medium to write to or read from the data layer. The user may then wish to label the medium to identify its contents. In this regard, the user then flips the medium so that the pixilated layer is down, allowing the laser unit to access the pixilated layer. The laser unit may include a sensor which detects certain features of the pixilated layer. For example, the laser unit may detect the reflectivity of the pixels. The laser unit, in conjunction with software operating on the CPU, for example, activates selected pixels by applying laser energy. An alternative laser unit may include at least two lasers such that the medium may be written (or read) without flipping the medium over, and these operations may be performed in parallel rather than sequentially.

As noted above, in one example, software operating on the CPU may be used to control the operation of the laser to activate the selected pixels. The software may be adapted to allow a user to customize a label through a graphical user interface. Inputs from the user may be translated by the software into commands for the operation of the laser. In this regard, the software may operate in conjunction with additional software or firmware associated with the laser unit.

Thus, in an exemplary embodiment, the software may be adapted to allow a user to configure a label. The software can then issue commands to the laser identifying the pixels that must be activated. The detection of the synchronization pixels is used to synchronize the software commands to the physical medium. The synchronization pixels allow the laser unit to determine the location of various pixels on the medium and to correlate that information with the commands from the software as to which pixels are to be activated.

Figure 3:
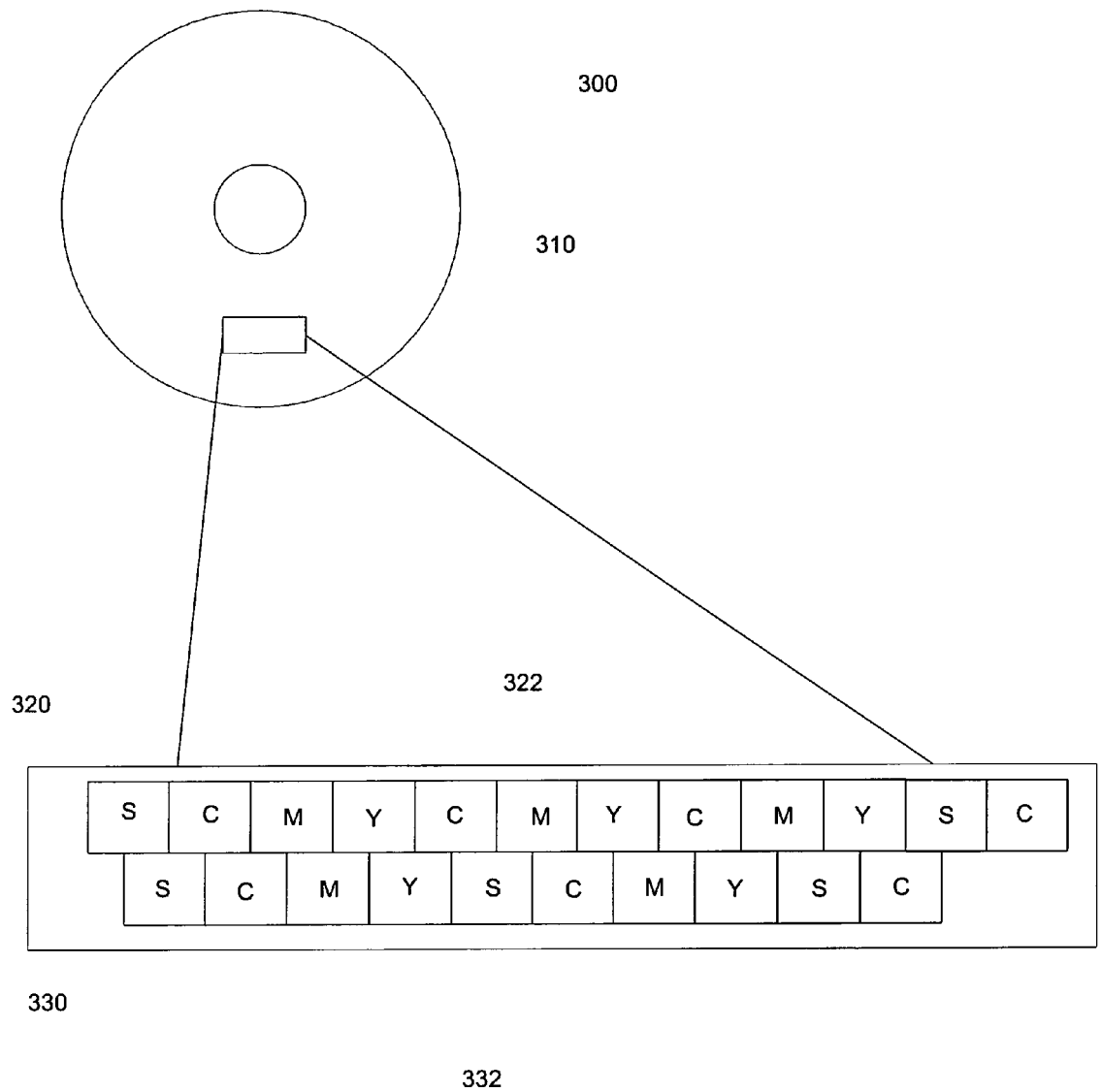
FIG. 3 illustrates a pixel arrangement according to another embodiment of the invention.

The arrangement of the synchronization pixels can provide specific information to the laser unit. In particular, radial tracking may be achieved by using the synchronization pixels to encode the track identification. For example, the frequency of occurrence of the synchronization pixels may be varied at each track in a localized region, as illustrated in FIG. 3. In the embodiment illustrated in FIG. 3, a disc media 300 is shown with a localized segment 310 of a pixilated layer noted and expanded for detail. It will be understood by those skilled in the art that the shape and size of the localized segment 310 as shown in FIG. 3 is for illustrative purposes only. For example, while FIG. 3 illustrates the tracks as being linear, the tracks on an actual medium, such as a disc, are typically curved along a circular arc or a spiral. The localized segment 310 includes two adjacent tracks 320, 330. The two tracks 320, 330 may be formed as concentric circles or may be different turns of a single spiral or circle. In either case, it may be desirable to distinguish between adjacent tracks for radial tracking purposes. In this regard, the inner track 320 is provided with a different frequency of synchronization pixels 322 than the outer track. In the illustrated embodiment, the inner track 320 includes a synchronization pixel 322 after three CMY sets, while the outer track 330 includes a synchronization pixel 332 after a single CMY set. The frequency can thus be correlated with the track identification in a manner detectable or determinable by the laser unit.

In another embodiment, the length of the synchronization pixels 224 may be varied. In this regard, an encoding/decoding method using pulse width modulation, for example, may be used with the varying length to encode/decode the track identification. The variation in the length of the synchronization pixels 224 should be sufficient to be detectable by the laser unit. In one embodiment, a ratio between two varying lengths of the synchronization pixels is between 1.5 and 2. The varying of the length of the synchronization pixels may be implemented across different tracks, as well as within each track. For example, in one embodiment, it is possible to have a series of relatively long synchronization pixels, while an adjacent track is provided with a series of relatively short synchronization pixels. In another embodiment, one track may be provided with a specific combination or sequence of long and short synchronization pixels, while adjacent tracks are provided with a different combination. Further, the varying of the length of the synchronization pixels may be combined with the frequency variations described previously so as to distinguish among a large number of different tracks.

Figure 4:
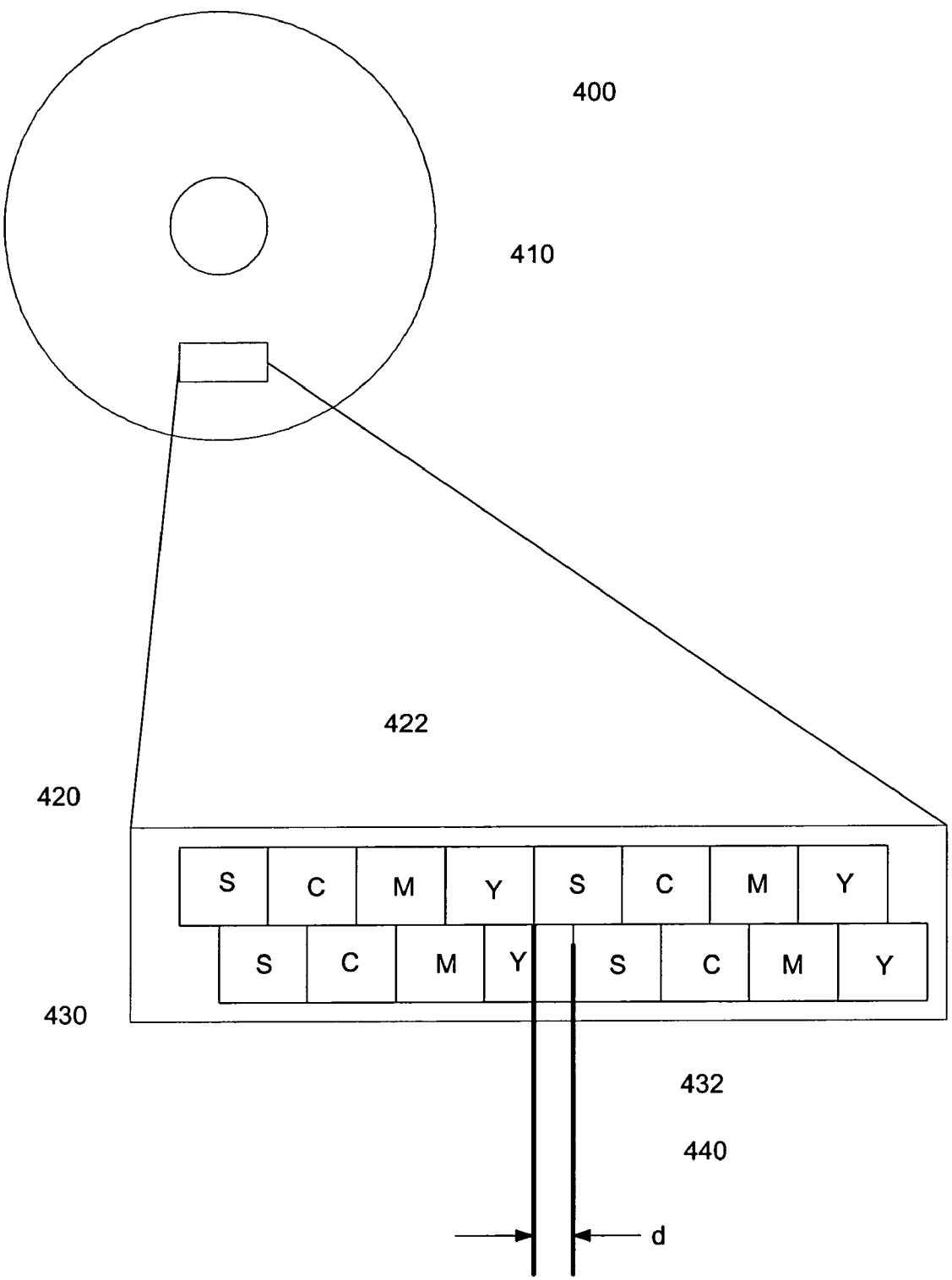
FIG. 4 illustrates a pixel arrangement according to still another embodiment of the invention.

Referring now to FIG. 4, another embodiment of a disc media according to the present invention is illustrated. A segment 410 of the disc media 400 is illustrated in greater detail. The segment 410 includes two tracks, an inner track 420 and an outer track 430. Each track 420, 430 is provided with synchronization pixels 422, 432 at a given frequency. In this embodiment, the pixels in adjacent tracks are offset by a distance d, 440, in the circumferential direction. The offset distance d, 440, is measured from the beginning of a synchronization pixel 422 in one track 420 to the beginning of a synchronization pixel 432 in an adjacent track 430. It is noted that, although the illustrated embodiment measures the distance d 440 based on synchronization pixels 422, 432, any other pixels may also be used to measure the distance d 430. For example, a distance between the start of a yellow pixel in one track may be measured against the start of a yellow pixel in the adjacent track. The distance d 440 may be used to provide radial tracking at least in a localized region of the disc media.

Figure 5:
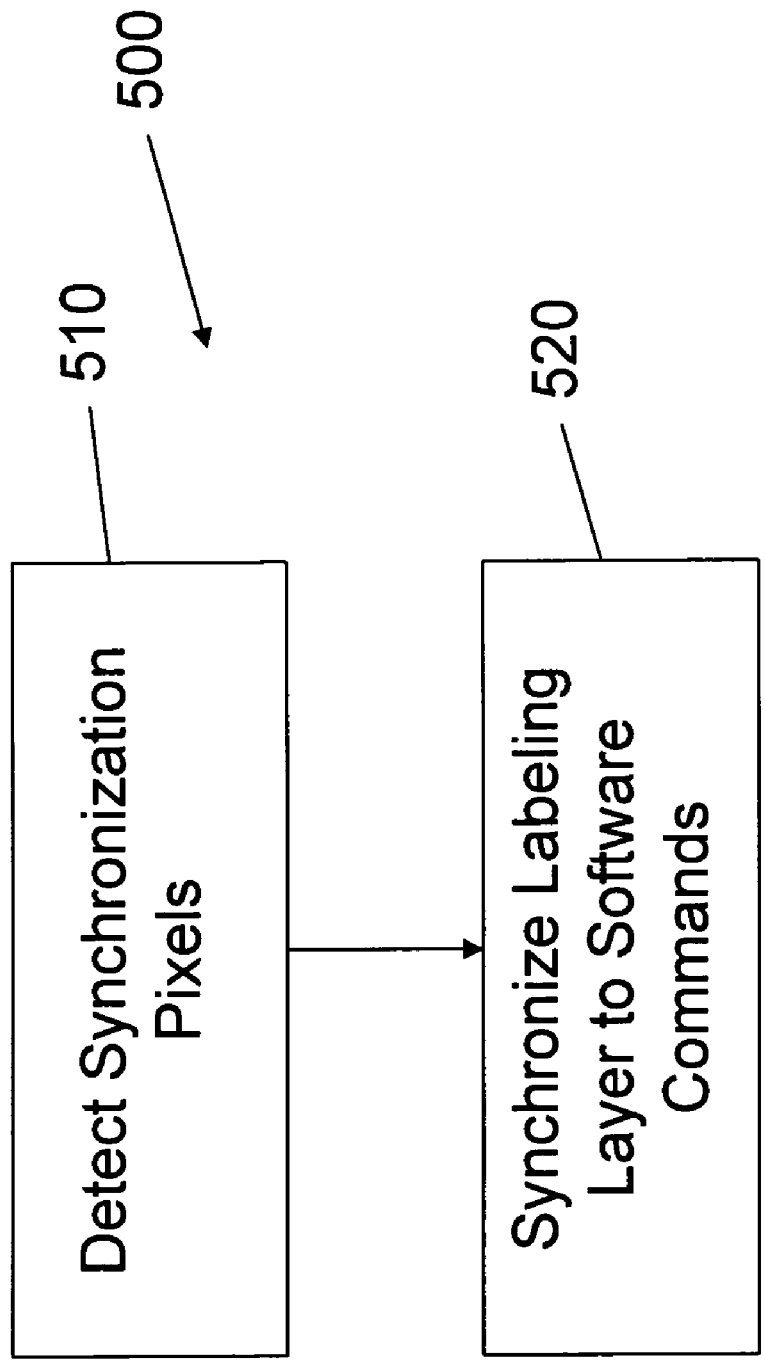
FIG. 5 is a flow chart illustrating a method according to an embodiment of the invention.

FIG. 5 is a flow chart illustrating a method according to an embodiment of the invention. The method 500 includes detecting synchronization pixels on a labeling layer of a digital media (block 510). As noted above, the synchronization pixels are interspersed among a plurality of color pixels. The detection of the synchronization pixels may be performed by a laser unit having a sensor adapted to detect certain features, such as reflectivity of the pixels. The synchronization pixels may have a sufficiently distinguishable reflectivity from the reflectivity of the color pixels. The method 500 uses the detection of the synchronization pixels to synchronize the labeling layer to a desired activation of selected pixels, as may be indicated by commands from software operating on a CPU, for example (block 520). The software may issue commands to activate selected color pixels by applying laser energy.

Figure 6:
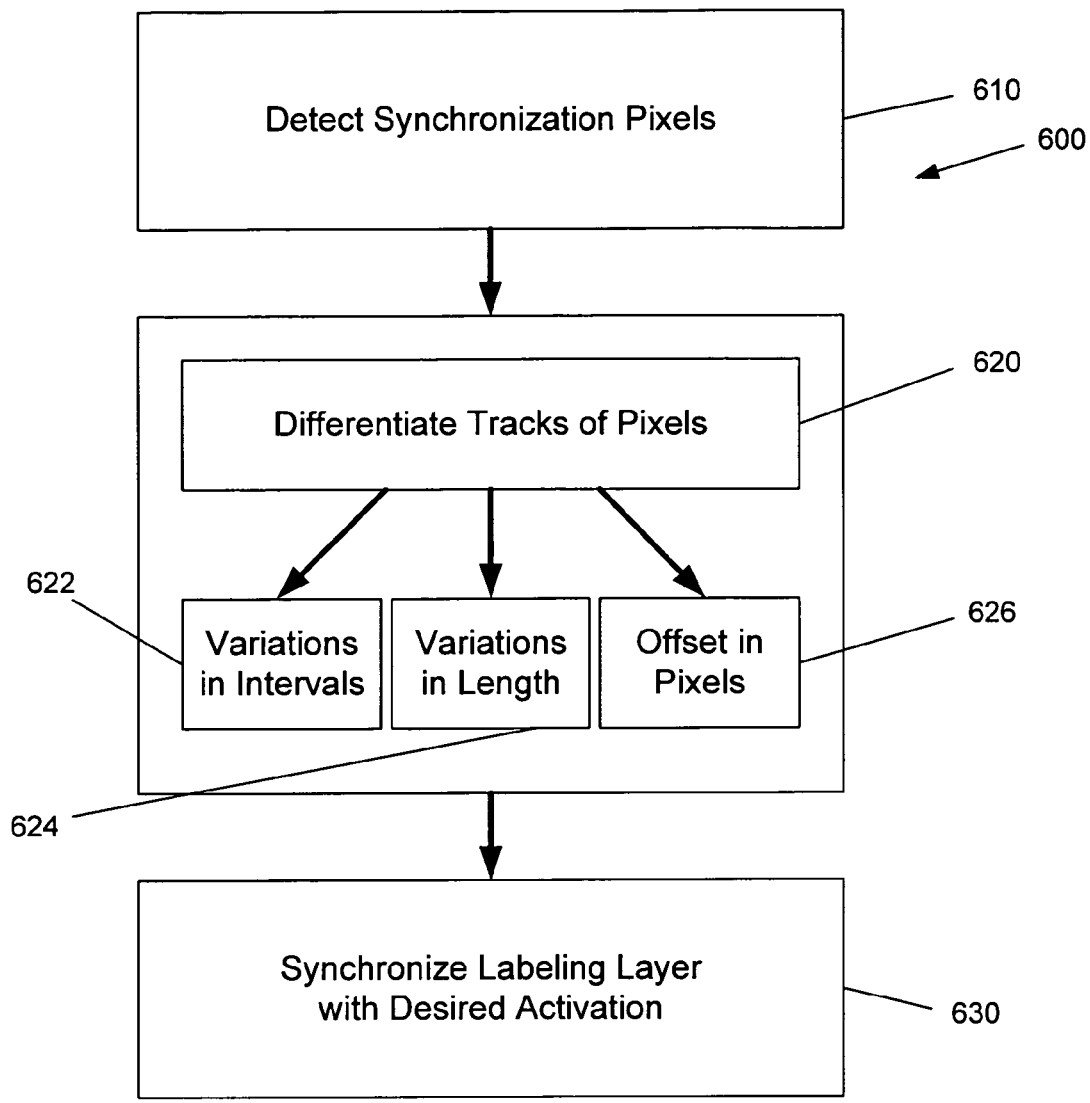
FIG. 6 is a flow chart illustrating a method according to another embodiment of the invention.

FIG. 6 is a flow chart illustrating a method according to another embodiment of the invention. The method 600 includes detecting synchronization pixels on a labeling layer of a digital media (block 610), similar to the detection in block 510 of FIG. 5 above. The method 600 uses the detection of the synchronization pixels to differentiate tracks of pixels in a localized region, for example, for track identification (block 620). The differentiation of the tracks may be achieved in any of a number of ways. For example, the method may use variation in the interval between, or frequency of occurrence of, the synchronization pixels (block 622). In other embodiments, variations in the length of the synchronization pixels may be used to differentiate adjacent tracks, for example (block 624). In still other embodiments, a detected offset in pixels of adjacent tracks may be used for differentiating the adjacent tracks (block 626). The method 620 then synchronizes the labeling layer to a desired activation of selected pixels, as may be indicated by commands from software operating on a CPU, for example (block 630).

The foregoing description of embodiments of the invention have been presented for purposes of illustration and description. It is not intended to be exhaustive or to limit the invention to the precise form disclosed, and modifications and variation are possible in light of the above teachings or may be acquired from practice of the invention. The embodiment was chosen and described in order to explain the principles of the invention and its practical application to enable one skilled in the art to utilize the invention in various embodiments and with various modification as are suited to the particular use contemplated. It is intended that the scope of the invention be defined by the claims appended hereto and their equivalents.

What is claimed is:

1. A digital medium, comprising:
   a substrate;
   a pixilated labeling layer disposed on said substrate, said labeling layer comprising:
      a plurality of color pixels adapted to form a predetermined color when activated; and
      a plurality of synchronization pixels interspersed among the color pixels, said synchronization pixels being distinguishable by a sensor from said color pixels prior to activation of said color pixels.

2. The digital medium according to claim 1, wherein each of said color pixels is adapted to form one of three or more colors.

3. The digital medium according to claim 2, wherein said three or more colors includes cyan, magenta and yellow.

4. The digital medium according to claim 2, wherein said three or more colors includes red, blue and green.

5. The digital medium according to claim 1, wherein each of said color pixels is formed of a visible dye adapted to be activated by energy from a laser.

6. The digital medium according to claim 5, wherein each of said color pixels is adapted to be activated by energy from said laser at substantially similar wavelengths.

7. The digital medium according to claim 1, wherein said synchronization pixels are formed of clear lacquer.

8. The digital medium according to claim 1, wherein said synchronization pixels include empty spaces.

9. The digital medium according to claim 1, wherein said synchronization pixels are positioned at regular intervals of color pixels.

10. The digital medium according to claim 1, wherein said labeling layer is divided into a plurality of tracks.

11. The digital medium according to claim 10, wherein said plurality of tracks form concentric circles.

12. The digital medium according to claim 10, wherein said plurality of tracks form a continuous spiral path.

13. The digital medium according to claim 10, wherein said synchronization pixels are positioned at regular intervals of color pixels on each track.

14. The digital medium according to claim 10, wherein said synchronization pixels are positioned at varying intervals of color pixels on each track.

15. The digital medium according to claim 14, wherein said synchronization pixels are positioned at a different interval of color pixels on at least some different ones of the tracks to provide encoding of track identification information.

16. The digital medium according to claim 10, wherein a different length of said synchronization pixel is used on at least two different tracks to encode track identification information.

17. The digital medium according to claim 10, wherein pixels in one of the tracks are offset from pixels in an adjacent track in the circumferential direction, said offset being used to encode track identification information.

18. The digital medium according to claim 17, wherein said offset is measured for said synchronization pixels.

19. The digital medium according to claim 1, wherein said digital medium is a CD read/write.

20. The digital medium according to claim 1, wherein said digital medium is a DVD read/write.

21. The digital medium according to claim 1, wherein said synchronization, pixels are positioned at intervals of color pixels.

22. A method of synchronizing a pixilated labeling media, comprising:
    detecting one or more synchronization pixels interspersed among a plurality of color pixels on a labeling layer of a digital media; and
    synchronizing said labeling layer with a desired activation of selected color pixels on said labeling layer.

23. The method according to claim 22, wherein the detecting of one or more synchronization pixels step comprises:
    detecting and differentiating a plurality of tracks of pixels.

24. The method according to claim 23, wherein the detecting and differentiating step comprises detecting variations in intervals of color pixels on each different track of said plurality of tracks.

25. The method according to claim 23, wherein the detecting and differentiating step comprises detecting variations in a length of said synchronization pixels.

26. The method according to claim 23, wherein the detecting and differentiating step comprises detecting an offset of pixels in a circumferential direction in adjacent tracks.

27. A system of synchronizing a pixilated labeling media, comprising:
    means for detecting one or more synchronization pixels interspersed among a plurality of color pixels on a labeling layer that forms an outer surface of a digital media; and
    means for synchronizing with a desired activation of selected color pixels on said labeling layer based on the result of detecting one or more synchronization pixels.

28. A program product, comprising machine readable program code for causing a machine to perform the following method steps:
    detecting one or more synchronization pixels interspersed among a plurality of color pixels on a labeling layer that forms an outer surface of a digital media; and
    synchronizing with a desired activation of selected color pixels on said labeling layer based on the result of detecting one or more synchronization pixels.

29. An optical drive for generating a label on optical media, comprising:
    a laser unit adapted to emit energy;
    a sensor adapted to detect or measure reflectivity of pixels in a pixilated labeling layer of an optical medium, said sensor further adapted to distinguish synchronization pixels from color pixels based on respective reflectivity; and
    a controller adapted to synchronize with a desired activation of selected pixels on said labeling layer based on detecting one or more synchronization pixels, said controller being further adapted to control said laser unit to emit energy onto said selected pixels for activation to form a label.

30. The optical drive according to claim 29, wherein said label is a multicolor label, and wherein each color pixel, when activated, is adapted to from one of three or more colors.

31. The optical drive according to claim 29, wherein said pixilated labeling layer includes a plurality of concentric tracks, at least some of the tracks including synchronization pixels arranged to uniquely identify said tracks.

32. The optical drive according to claim 29, wherein said laser unit is adapted to emit energy at a substantially similar wavelength to activate each of said selected pixels.

33. The optical drive according to claim 29, wherein said controller is adapted to receive instructions indicative of said desired activation of selected pixels.

34. The optical drive according to claim 29, wherein said controller is implemented as firmware within said laser unit.

35. A digital medium, comprising:
    a substrate;
    a pixilated labeling layer disposed on said substrate to form an outer surface of said medium, said labeling layer comprising:
        a plurality of color pixels adapted to form a predetermined color when activated; and
        a plurality of synchronization pixels interspersed among the color pixels, said synchronization pixels being distinguishable by a sensor from said color pixels prior to activation of said color pixels.

36. A method of synchronizing a pixilated labeling media, comprising:
    detecting one or more synchronization pixels interspersed among a plurality of color pixels on a labeling layer disposed on an outer surface of a digital media; and
    synchronizing said labeling layer with a desired activation of selected color pixels on said labeling layer.

37. An optical drive for generating a label on optical media, comprising:
    a laser unit adapted to emit energy;
    a sensor adapted to detect or measure reflectivity of pixels in a pixilated labeling layer disposed on an outer surface of an optical medium, said sensor further adapted to distinguish synchronization pixels from color pixels based on respective reflectivity; and a controller adapted to synchronize with a desired activation of selected pixels on said labeling layer based on detecting one or more synchronization pixels, said controller being further adapted to control said laser unit to emit energy onto said selected pixels for activation to form a label.

38. A digital medium, comprising:

a substrate;

a pixilated labeling layer disposed on said substrate, said labeling layer comprising:

a plurality of color pixels adapted to form a predetermined color when activated; and a plurality of synchronization pixels interspersed among the color pixels, said synchronization pixels being distinguishable by a sensor from said color pixels during a labeling operation that includes activation of at least some of said color pixels.

* * * * *

UNITED STATES PATENT AND TRADEMARK OFFICE
CERTIFICATE OF CORRECTION

PATENT NO. : 7,324,128 B2
APPLICATION NO. : 10/834744
DATED : January 29, 2008
INVENTOR(S) : Andrew L. Van Brocklin et al.

It is certified that error appears in the above-identified patent and that said Letters Patent is hereby corrected as shown below:

In column 7, line 37, in Claim 21, after "synchronization" delete ",".

In column 8, line 29, in Claim 30, delete "from" and insert -- form --, therefor.

Signed and Sealed this

Fifth Day of August, 2008

JON W. DUDAS
*Director of the United States Patent and Trademark Office*